H. HOLT.

Marking-Wheel.

No. 6,714. Reissued Oct. 26, 1875.

Witnesses:
Francis H. Beers
C. Wythe Petty

Inventor:
Horace Holt

H. PETERS, PHOTO-LITHOGRAPHER, WASHINGTON, D. C.

UNITED STATES PATENT OFFICE.

HORACE HOLT, OF BROOKLYN, NEW YORK.

IMPROVEMENT IN MARKING-WHEELS.

Specification forming part of Letters Patent No. 52,169, dated January 23, 1866; reissue No. 6,714, dated October 26, 1875; application filed March 26, 1875.

*To all whom it may concern:*

Be it known that I, HORACE HOLT, of the city of Brooklyn, county of Kings and State of New York, have invented a new and Improved Marking-Wheel; and I do hereby declare that the following is a full, clear, and exact description thereof, which will enable others skilled in the art to make and use the same, reference being had to the accompanying drawings forming part of this specification, in which—

Figure 1:
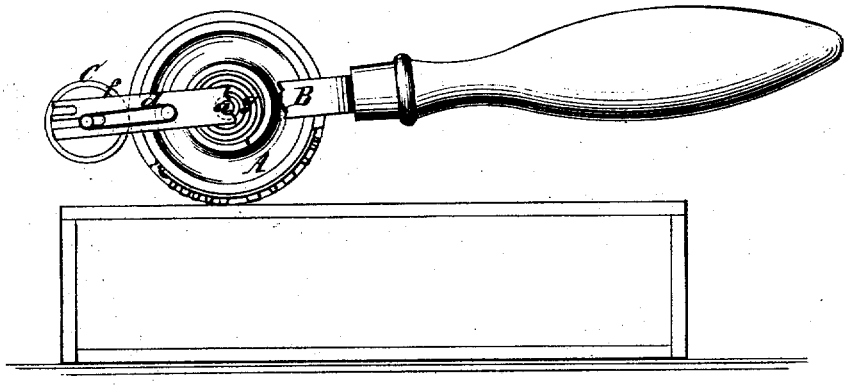
Figure 2:
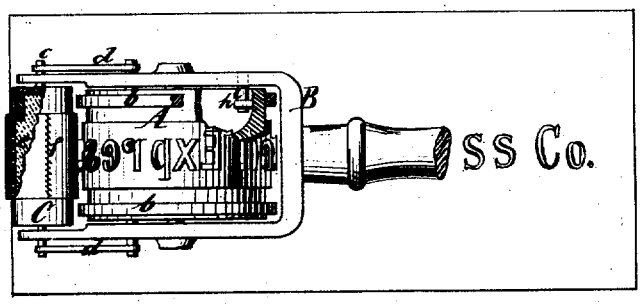

Figure 1 represents a side elevation of this invention. Fig. 2 is a sectional plan or top view of the same.

Similar letters of reference indicate like parts.

This invention consists in a revolving type-wheel, arranged in a suitable handle, in combination with an ink-roller, in such a manner that, by carrying said type-wheel over the cover of a box, or over any other surface, the types on said wheel produce an impression, and the marking of a box or other article can be effected neatly and distinctly, with little loss of time.

The ink-roller shown in the drawings is composed of a hollow cylindrical reservoir, perforated with small holes, and surrounded by a strip of cloth or other absorbent material, so that the same is capable of holding a supply of ink for a large number of impressions.

The type-wheel is provided with rims or flanges, preferably made of india-rubber or other elastic material, so that the types can be depressed on the surface to be marked with the requisite force to produce the desired impression. The rims or flanges serve to keep the surface of the types in a plane parallel with the surface to be marked, which is otherwise often difficult, owing to the different lengths of lines of type, or the position of the type at the side of the surface of the type-wheel.

It is also advantageous to use a coiled or other spring, which, when applied to said type-wheel, is arranged to carry the same back after each impression to the starting-point, and thereby the types are brought in contact with the ink-roller, and supplied with the requisite quantity of ink for the subsequent impression; and, furthermore, the type-wheel readjusts itself in the required position for starting.

A represents a wheel, made of cast-iron or other suitable material, and arranged so that the desired types can be applied to or inserted in its periphery, either permanently, by means of a strip of copper or other suitable material, or so that said types can be changed at pleasure. This type-wheel is mounted on an axle, *a*, which has its bearings in a forked handle, B, and it is provided with projecting flanges *b*. As the wheel revolves the types on its circumference come in contact with the surface of the ink-roller C, which is mounted on an axle, *c*, having its bearings in the extreme ends of the forked handle B. Suitable springs, *d*, draw the ink-roller toward the type-wheel, and, by disconnecting said springs, the ink-roller can be removed from its seat.

Each end of the fork of the handle has two slots—one long and the other short—which form main and secondary bearings for the journals of the inking-roller. When it is desired that the roller and wheel should be in contact the journals of the former should be in the long slots, as shown in the drawing, which represents the roller in its normal position; but, as it is sometimes necessary that the marking-wheel and roller should revolve independent of each other, as when "distributing" ink on the latter, or when it is being used on a separate flat form, or when either the wheel or the roller, or both, are being cleaned, then the journals of the latter should be placed in the short slots or secondary bearings.

Said ink-roller may be made solid, similar to ordinary printers' rollers; but I have shown in the drawings a hollow cylindrical reservoir, *e*, to which access can be had by removing one of its heads. This reservoir is perforated with a large number of small holes. The roller is surrounded by a strip, F, of cloth, or other absorbent material. By means of the reservoir, if used, a large supply of ink can be carried in the roller, and the marking-wheel produces a number of impressions before it is necessary to recharge the same. A spring, *g*, applied to the axle of the wheel A, (see Fig. 1,) carries the same back until the stud *h* in the wheel comes in contact with a pin, *i*, projecting from the inner surface of the forked handle.

By this stud and pin the starting-point of the wheel is defined, and, by the action of the spring, the wheel is carried back to this starting-point after each operation. In moving back the types, being in contact with the ink-roller, are supplied with the requisite quantity of ink for the subsequent operation.

It is obvious that the starting-point of the type-wheel can be determined by other means besides the stud *h* and pin *i*.

By this simple device a large number of boxes or other packages can be marked neatly and distinctly with great dispatch.

I am aware that a patent was granted Edwin Crawley, dated July 8, 1856, in which was shown a handle holding a type-wheel and several inking-rollers, arranged with a distributing-band. This I do not claim; but

I claim as new and desire to secure by Letters Patent—

1. The combination, with a frame and handle, of a type-wheel provided with a stud-pin, for defining the starting and stopping points, and an inking-roller, constructed and operating substantially as specified.

2. The combination, with a handle, of a type-wheel provided with flanges, for keeping the plane of the type parallel with the surface of the article to be marked.

3. A type-wheel provided with yielding flanges, constructed and operating substantially as and for the purpose described.

4. A spring, in combination with a type-wheel and stop-pin, or its equivalent, for retracting the type-wheel to its starting-point, substantially as and for the purpose set forth.

5. The combination of a type-wheel with a combined inking-roller and ink-reservoir, constructed substantially as and for the purpose described.

6. The combination of a handle and type-wheel with a spring, for retracting the type-wheel to its starting-point, substantially as described.

7. In combination with an inking-roller and its usual bearings, secondary bearings so arranged that the roller may revolve independently of the wheel, substantially as set forth.

HORACE HOLT.

Witnesses:

FREDERIC H. BELL,
C. WYLLYS BETTS.